J. R. EAST.
Bee-Hives.
No. 144,750.  Patented Nov. 18, 1873.
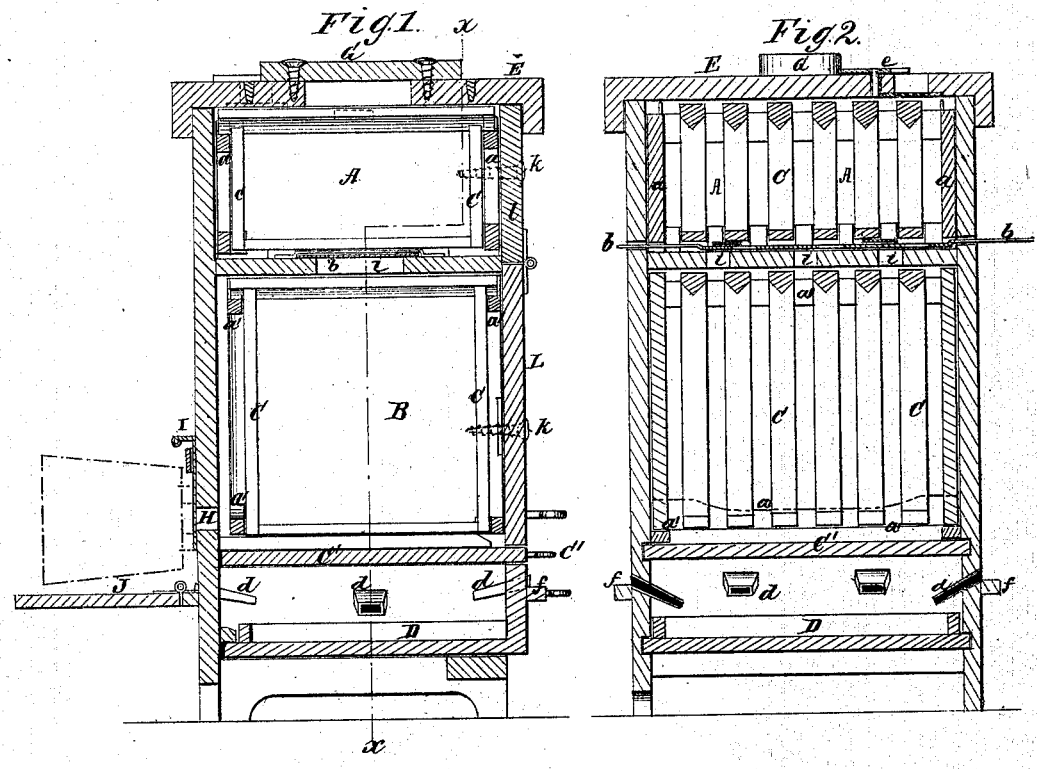
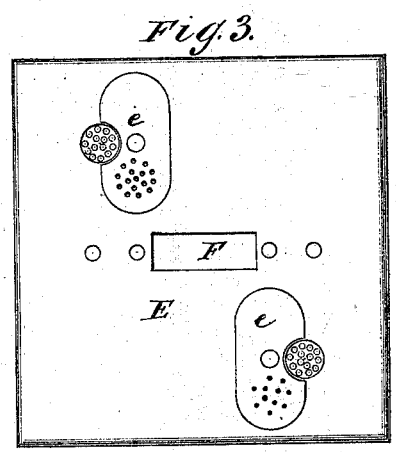
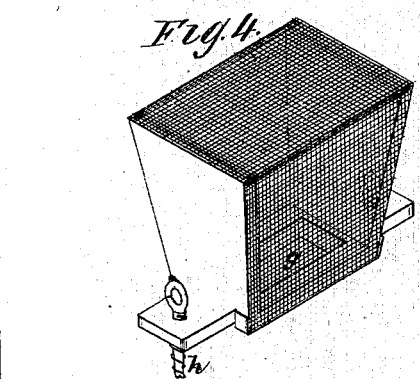
Witnesses:  
G. Matthys.  
John C. Kemon
Inventor:  
Joseph R. East  
Per ——— Attorneys.

UNITED STATES PATENT OFFICE.

JOSEPH R. EAST, OF FINCASTLE, TENNESSEE.

IMPROVEMENT IN BEE-HIVES.

Specification forming part of Letters Patent No. 144,750, dated November 18, 1873; application filed August 5, 1873.

*To all whom it may concern:*

Be it known that I, JOSEPH R. EAST, of Fincastle, in the county of Campbell and State of Tennessee, have invented a new and Improved Bee-Hive; and I do hereby declare the following to be a full, clear, and exact description of the same, reference being had to the accompanying drawing forming part of this specification, in which—

Figure 1 is a sectional elevation of the hive, and Fig. 2 a similar view on the line $x\,x$ of Fig. 1. Fig. 3 is a top view of the same. Fig. 4 is a perspective view of the ventilating attachment.

My invention is a bee-hive so constructed that honey can be removed with perfect safety, yet without injuring the bees. The whole or a part of the bees can be removed with equal facility. It is well ventilated. It is also provided with a means of protection against moths, and is adapted for the use of wire basket for receiving the bees, and giving them air when removing honey or part of the brood, or at other times.

The hive is simple in construction, and can be made at small expense.

The case or body of the hive is divided into two compartments, the upper one, A, being the honey-chamber, the lower one, B, the brood-chamber. These chambers communicate with each other by small apertures $i$, which are opened or closed at will by a slide operated from the outside by means of handles $b\,b$. Each chamber, also, has a door on the back side of the hive, K and L, and is provided with a movable frame, $a$ and $a'$, in which are fitted comb-frames $c\,c$, their lateral movement being prevented by notches, in which they are fitted. The bottom C of the hive is made detachable, the same being adapted to slide in grooves; and beneath this bottom is a false bottom, D, used as a moth-trap, and provided with openings $d\,d$, leading from the outside of the hive. The top E of the hive is detachable, and is provided with two ventilators, $e\,e$, which may be opened or closed, as required; also, with a smoke-hole, F, closed by a removable cover, G. H is the entrance of the brood-chamber, which can be closed by the slide I. J is a hinged shelf or alighting-board, which can be folded against the hive when not in use. A ledge, $f$, runs around the hive under the openings of the moth-trap.

In Fig. 4 I have shown a wire basket with a small opening, $g$, in one end, and provided with thumb-screws $h$, to facilitate handling. The basket is applied, in practice, to the smoke-hole F, or the bee-entrance H, as desired, and as hereinafter described.

To hive bees, the bottom C and the moth-trap D are drawn out. The hive is then placed over the swarm, the bottoms being returned as soon as the bees have entered the hive.

In the operation of robbing or removing the honey, the bee-basket is attached to the bee-entrance H, the ventilators and smoke-hole in the top are opened, and, communication between the chambers being also open, smoke is blown through the smoke-hole F until all the bees are driven into the brood-chamber. Then, communication between the chambers being cut off by the slide, the honey can be taken from the upper chamber by removing the whole frame $a$, or the comb-frames $c\,c$ singly. To do this more readily, the door K may be opened by loosening the screws $k\,k$.

To examine the brood-chamber, or to remove the old brood-comb, which it is often necessary to do, the cover of the smoke-hole in the top is removed, the bee-basket put on in its place, and the bee-entrance closed by the slide. The bottom of the hive, and also the moth-trap, are drawn from their places and smoke applied to the bottom of the hive. The aperture between the two chambers being open, the bees are driven into the upper chamber and into the bee-basket, the latter serving, as also in the former operation, to supply them with fresh air. Access to the brood-chamber can be had through the door L by removing the screws $l\,l$. In this operation, also, the frame $a\,a'$ may be removed, or a part of the comb-frames.

Having thus described my invention, what

I claim as new, and desire to secure by Letters Patent, is—

1. The removable frames $a\ a'$, for containing the comb-frames $c\ c$, the same being provided with notches to receive said comb-frames, substantially as described.

2. The moth-trap formed of the sliding false bottom D, in combination with the bottom $c'$ and openings $d\ d$ in the side of the hive, as shown and described.

JOSEPH R. EAST.

Witnesses:
 J. OVERTON,
 W. R. MARS.